Dec. 17, 1963   J. K. BRUCE   3,114,449
APPARATUS FOR SHORT TERM ACCUMULATION OF CONVEYED ARTICLES
Filed Dec. 12, 1960   9 Sheets-Sheet 1

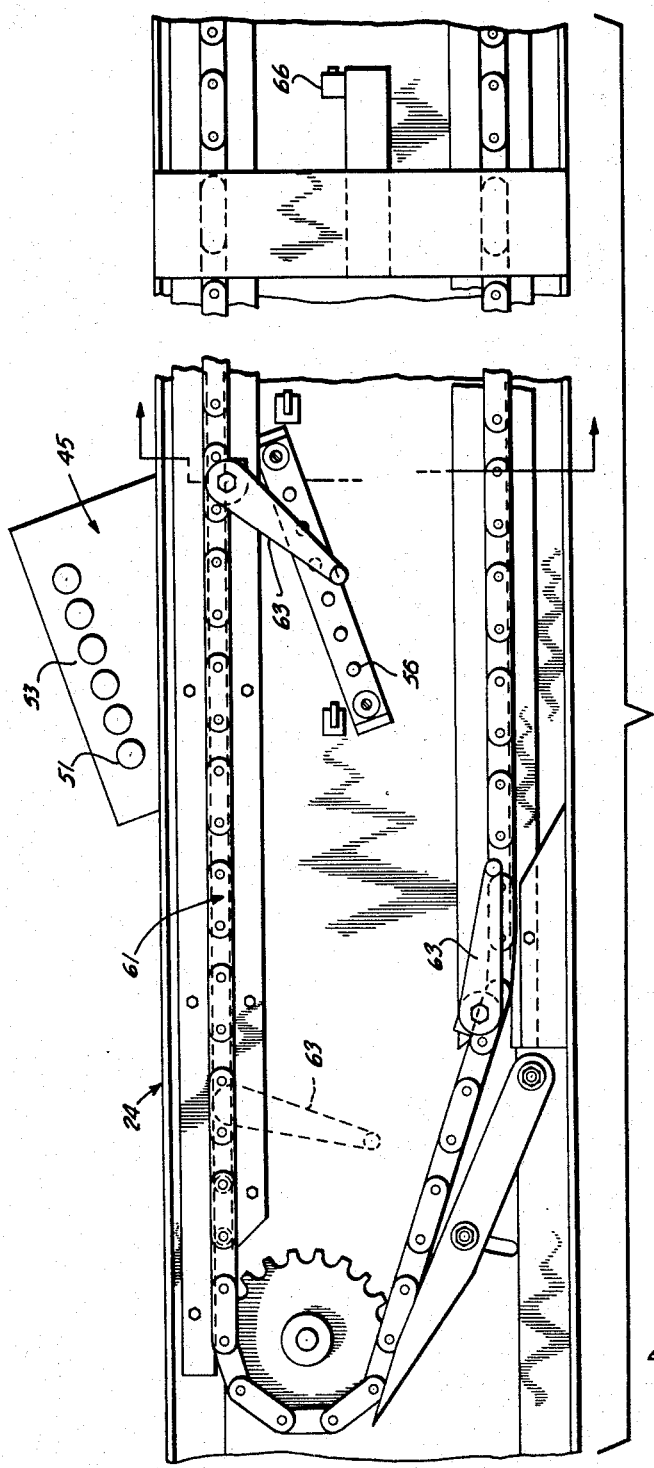

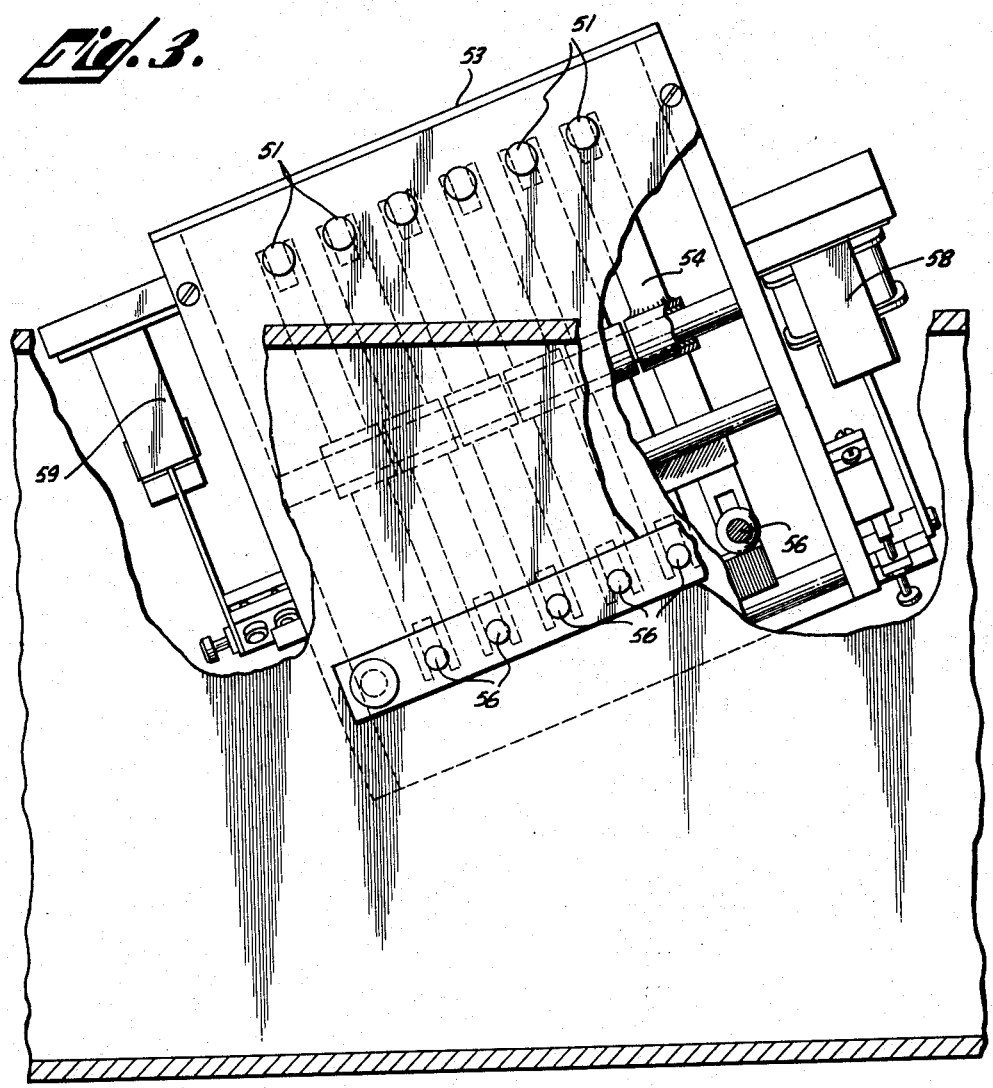

Dec. 17, 1963 J. K. BRUCE 3,114,449
APPARATUS FOR SHORT TERM ACCUMULATION OF CONVEYED ARTICLES
Filed Dec. 12, 1960 9 Sheets-Sheet 4
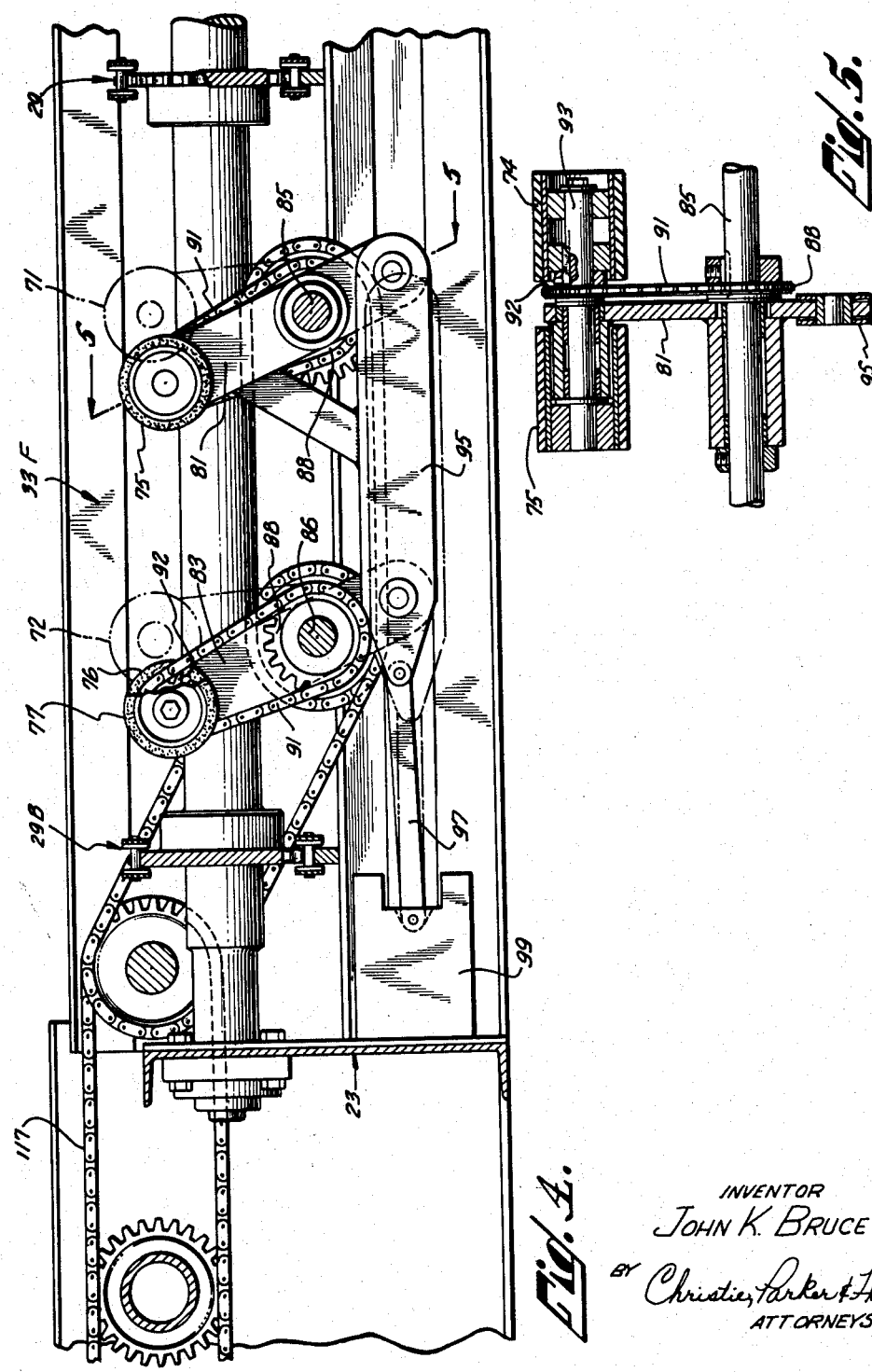
INVENTOR
JOHN K. BRUCE
BY Christie, Parker & Hale
ATTORNEYS

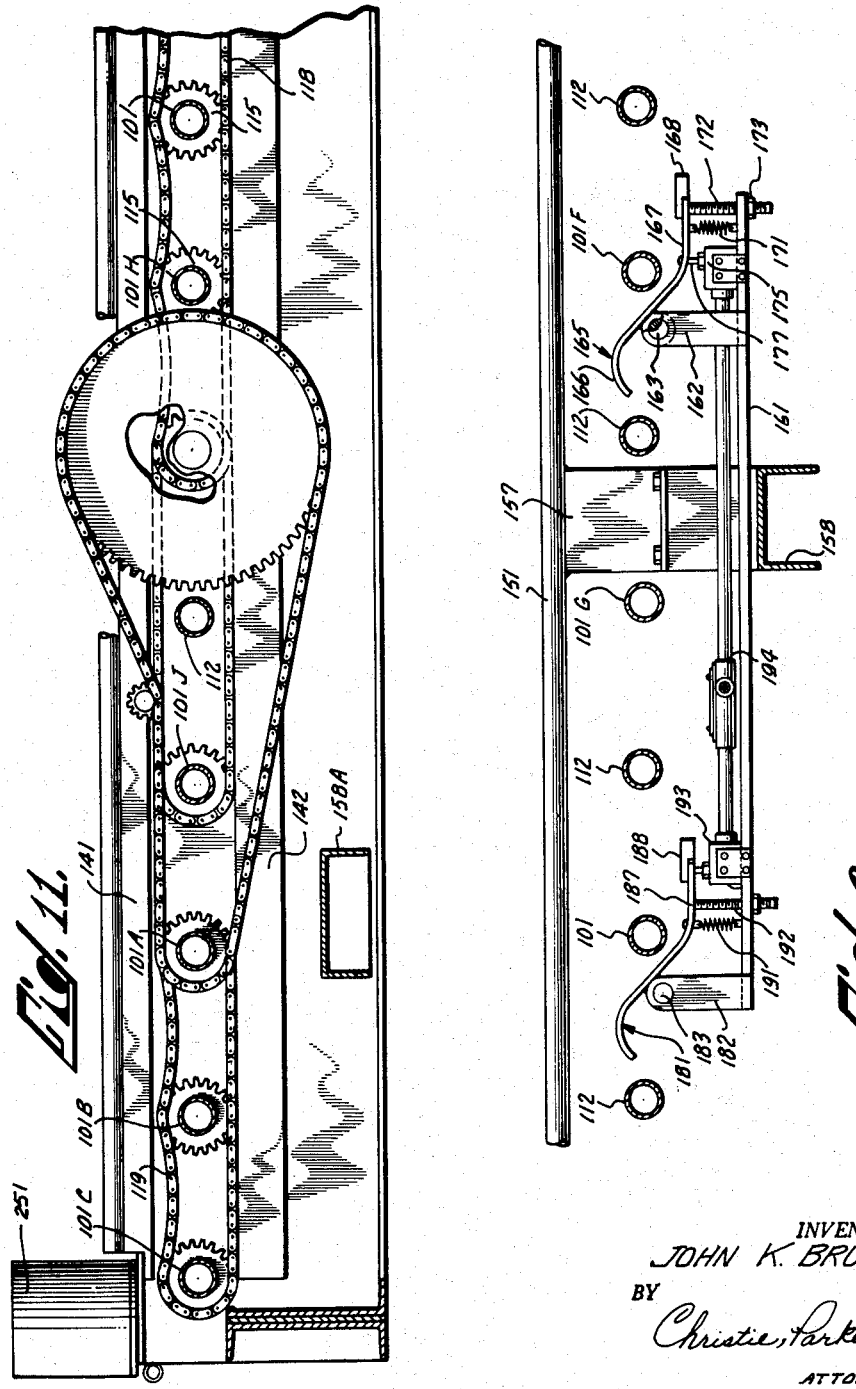

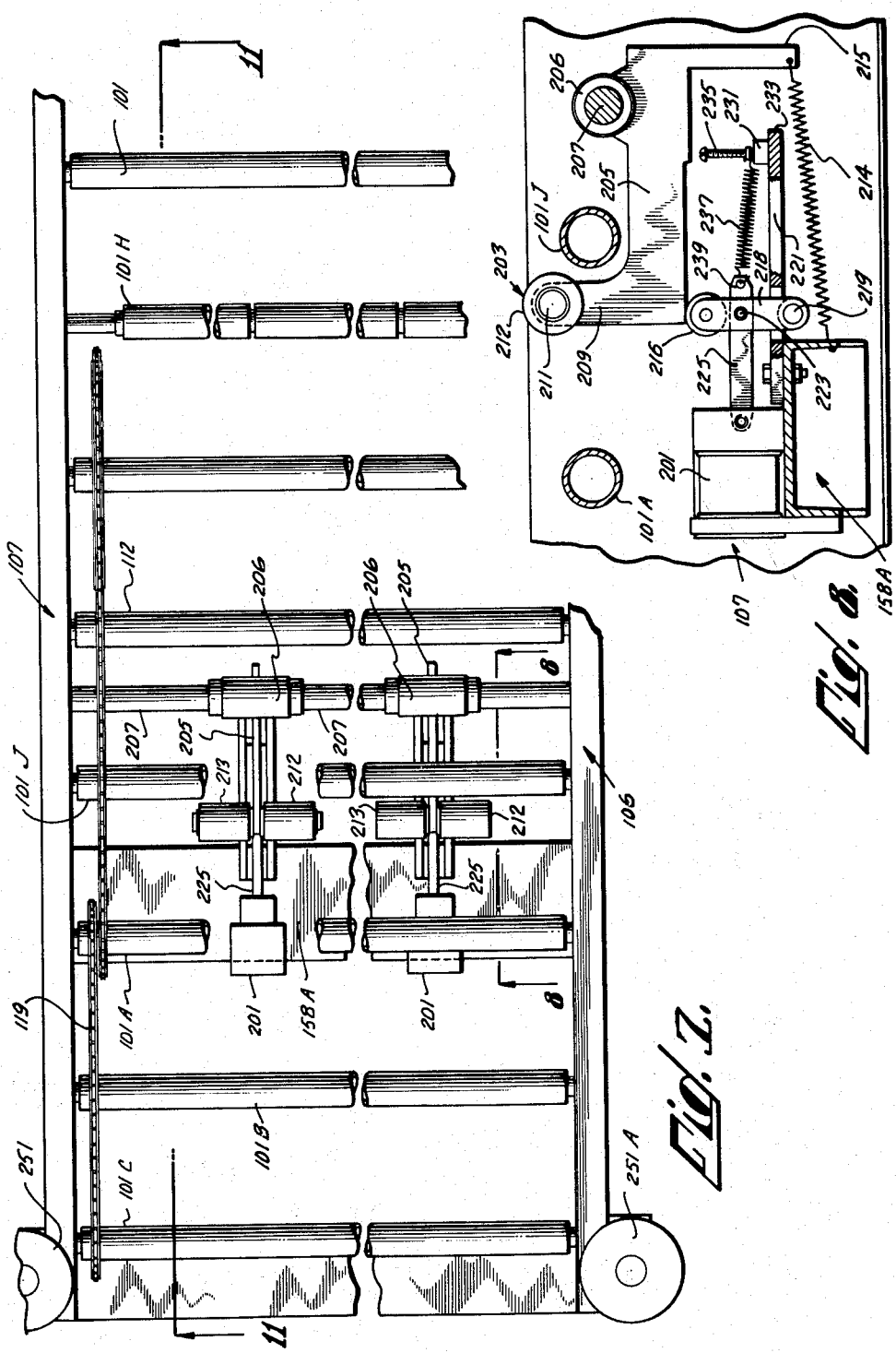

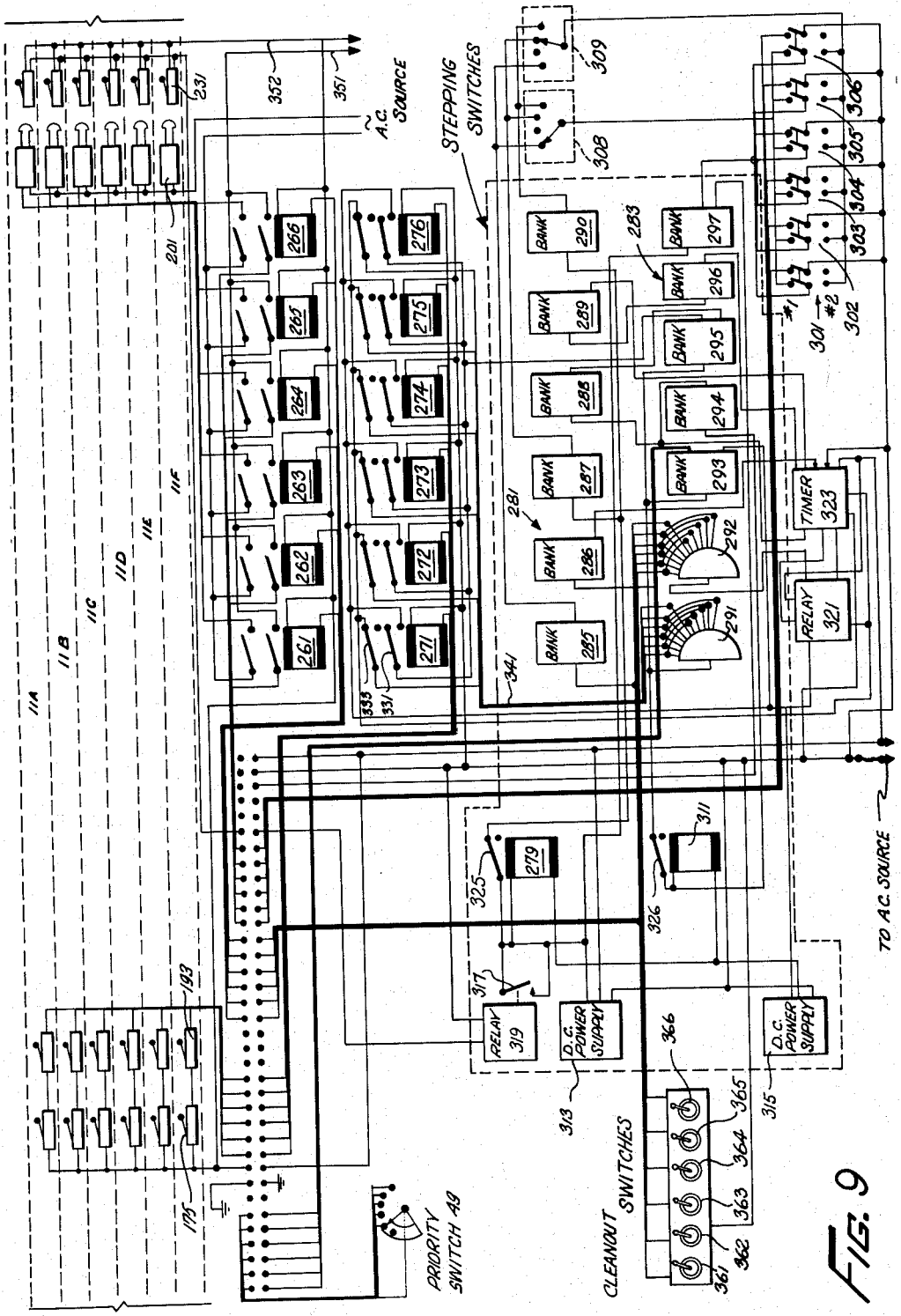

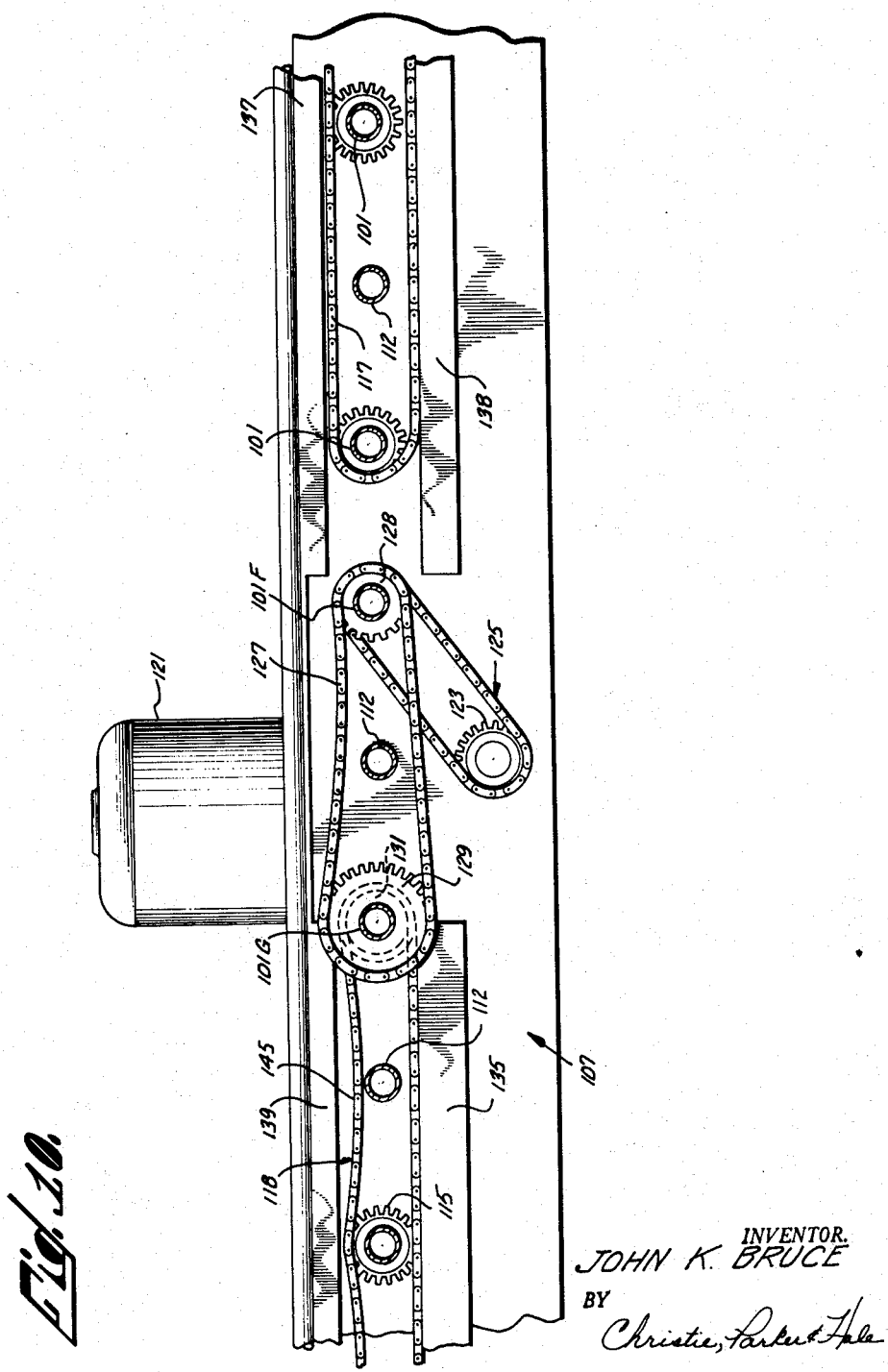

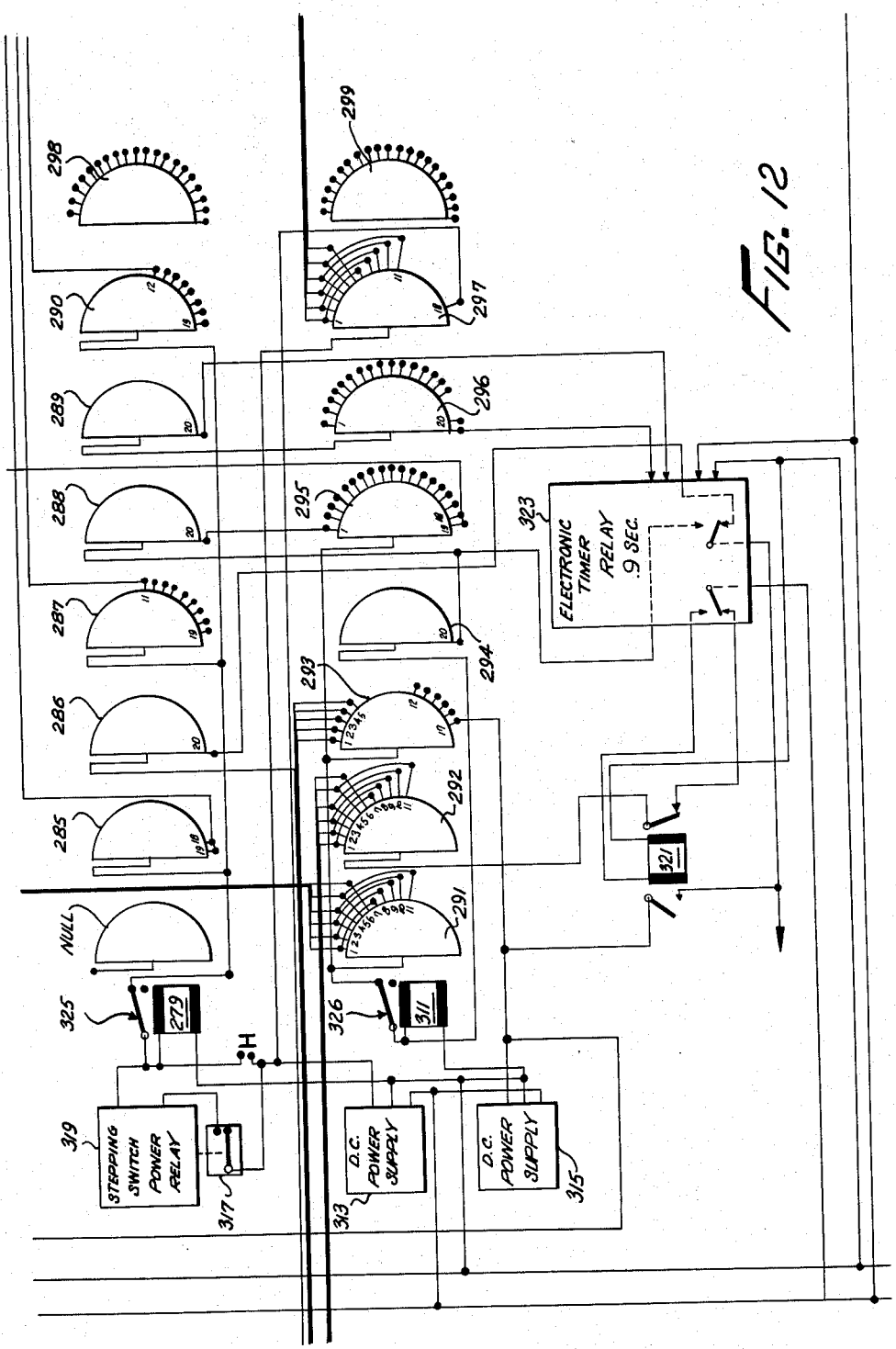

United States Patent Office 3,114,449
Patented Dec. 17, 1963

---

3,114,449
APPARATUS FOR SHORT TERM ACCUMULATION
OF CONVEYED ARTICLES
John K. Bruce, La Verne, Calif.
(16244 Arrow Highway, Irwindale, Calif.)
Filed Dec. 12, 1960, Ser. No. 75,195
7 Claims. (Cl. 198—40)

The invention relates to apparatus for detaining or storing conveyed articles for short periods of time during the progression of the articles in a conveying system. This is a continuation-in-part of application Serial No. 768,171 filed October 20, 1958, now Patent No. 3,045,803, issued July 24, 1962.

In conveyor systems which transport articles between various processing stations there is often a need to accumulate a group or batch of similar articles so that the entire group so accumulated can be processed at once. For instance, in the fruit processing and packaging industry, fruit is initially boxed after washing in accordance with ripeness. After the washing and boxing stage, the fruit is stored until it reaches a desired sugar content. The period of storage varies with the degree of ripeness at the time the fruit was picked. The fruit is conveyed from the boxing stations to the storage facility on a single conveyor, and the boxes of fruit are not put on the conveyor in any particular sorted order.

Prior to storage the fruit is stacked. The conventional stacking apparatus handles a certain number of boxes at one time. It builds a stack which the conventional box handling apparatus such as a fork-lift truck can convey from place to place. It is desirable that each of the stacks contain fruit of the same degree of ripeness so that they may be stored for the same period and at the same temperature. Therefore, this is one particular instance in which a series of unlike articles on an input conveyor are preferably dispatched from the input conveyor into a short term storage area which accommodates or holds the articles until a proper batch number of articles is ready to be processed.

Other industries have similar conveying situations. The batch or accumulated group of articles may be held until the next succeeding process station has been cleared to accommodate them. Alternately, the accumulating period may be for the sole purpose of achieving a sufficient number of articles to make the next process step efficient. The number of needed accumulation areas varies with the particular industry and process in which the apparatus embodying the invention is to be used.

The invention contemplates apparatus for handling articles which comprises a plurality of preferably parallel accumulator conveyors, each having a receiving, an accumulating and a discharge section. Each of the plurality of conveyors is adapted to receive different preselected ones of the articles. Each section of each conveyor has driving means and first sensing means for registering the presence of articles on the conveyor. Each conveyor has second sensing means for registering the number of articles discharged therefrom. A movable stop is associated with each conveyor between its accumulating and discharge section. First control means for selectively releasing the respective stop means of the several conveyors to release the articles in the accumulating sections may be adjacent or remote from the conveyors themselves. The first control means releases the respective stop means of the several conveyors so that articles may move from the accumulating sections to the discharge section of each conveyor. The first control means is connected to the first sensing means so that the first control means is not operable until the first sensing means registers a pre-determined number of articles in a particular accumulating section which is to be discharged. Second control means for selectively re-setting the respective stop means of the several conveyors is operable when the second sensing means counts a given number of articles released from the accumulating section of the respective conveyor.

The preferred embodiment of the invention has two or more accumulator conveyors. Preferably means are provided so that selected ones of the accumulator conveyors are preferentially discharged. For instance, articles allocated to a particular accumulator conveyor may predominate in number on the input conveyor. It is preferable that the particular accumulator conveyor be discharged each time its first sensing means registers the presence of a requisite batch number in the conveyor. This is in preference to a rigid sequential discharge of each of the accumulator conveyors in the accumulator apparatus.

Although it is possible for the accumulator apparatus of the invention to operate in response to manually loaded articles, such operation is most inefficient and loses most of the advantages inherent in mechanized conveyor systems. Therefore, the accumulator apparatus of the invention is preferably used in conjunction with an input conveyor and selecting apparatus such as that described in my abandoned application Serial No. 768,395, filed October 20, 1958, and entitled Selecting and Transfer Apparatus for Conveying Articles. That application is concerned with an input conveyor and selector and transfer mechanism for moving articles from the conveyor to output stations such as the accumulator conveyor of the present application. The basic operation of the apparatus of my abandoned application is described later on in the present application to illustrate the utility of the apparatus embodying the invention of the present application.

The sensing means for registering the presence of articles on each accumulator conveyor is preferably a spaced pair of electrical switches connected to the first control means. The two switches indicate a particular number of articles in the accumulator section of the conveyor when they are simultaneously closed. The switches are located from the downstream end of the accumulator section a distance equal to a certain number of articles. When sufficient articles have been accumulated so that the last article continuously depresses the first electrical switch, the entry of a subsequent article into the conveyor section and into contact with the second switch indicates to the first control means that a sufficient number of articles is in the accumulator section.

A stop roller is held in position above the level of the conveyor to preclude further travel of articles along the conveyor past the stop roller. The roller is mounted on pivotally supported arms. The arms extend horizontally from the pivots and then upwardly to the stop roller. The arms are counterbalanced so that the weight of the stop roller is insufficient to swing the arm and roller below the level of the conveyor. However, pressure of articles against the stop roller overcomes the balanced condition. A solenoid-operated check roller bears against the roller support arm and normally prevents articles from depressing the stop roller. The solenoid is actuated and removes the check roller when coincidence is achieved between the previously described first sensing means of the particular conveyor and the imposed conditions in the first control means.

Each stop roller is counterloaded to swing upwardly into stop position after each article passes over it. It is successively depressed by each succeeding article. Each time a stop roller is depressed, the support arm contacts a counter. Pulses from the counter operate a stepping switch preferably a part of the first control means to record the number of articles discharged from the accumulator section of the accumulator conveyor.

Each accumulator conveyor is preferably comprised of a series of tubular rollers. The rollers of the receiving and accumulating sections of each accumulator conveyor are preferably driven at the same speed. The rollers beyond the stop means separating the accumulating section from the discharge section are driven at a high speed relative to the rollers of the accumulating and receiving sections. All sections are preferably driven from a single motor.

These and other advantages of the invention are apparent in the following detailed description and drawings in which:

FIG. 2 is a fragmentary elevation partly broken away taken along line 2—2 of FIG. 1 and showing the basic mechanism of the selector apparatus used with the embodiment of FIG. 1;

FIG. 3 is a fragmentary elevation partly in section of the selector apparatus;

FIG. 4 is a fragmentary sectional elevation taken along line 4—4 of FIG. 1 and illustrating the preferred transfer means for moving articles from the input conveyor to the accumulator apparatus of the invention;

FIG. 5 is a fragmentary sectional elevation taken along line 5—5 of FIG. 4;

FIG. 6 is a fragmentary sectional elevation taken along line 6—6 of FIG. 1 and illustrating the sensing means for registering the presence of articles on an accumulator conveyor;

FIG. 7 is a fragmentary plan view of a discharge section of the accumulator and the stop means of the accumulator sections;

FIG. 8 is a detailed sectional elevation of the stop means and counting means and taken along line 8—8 of FIG. 7;

FIG. 9 is a schematic wiring diagram of the electrical control system for the accumulator apparatus;

FIG. 10 is a schematic sectional elevation of the drive system for the conveying rollers of the accumulator;

FIG. 11 is a sectional elevation taken along line 11—11 of FIG. 7 showing the drive system for the discharge section of the accumulator conveyor; and FIG. 12 is a schematic wiring diagram showing in more detail the counting means of the electrical system of FIG. 9.

Figure 1:
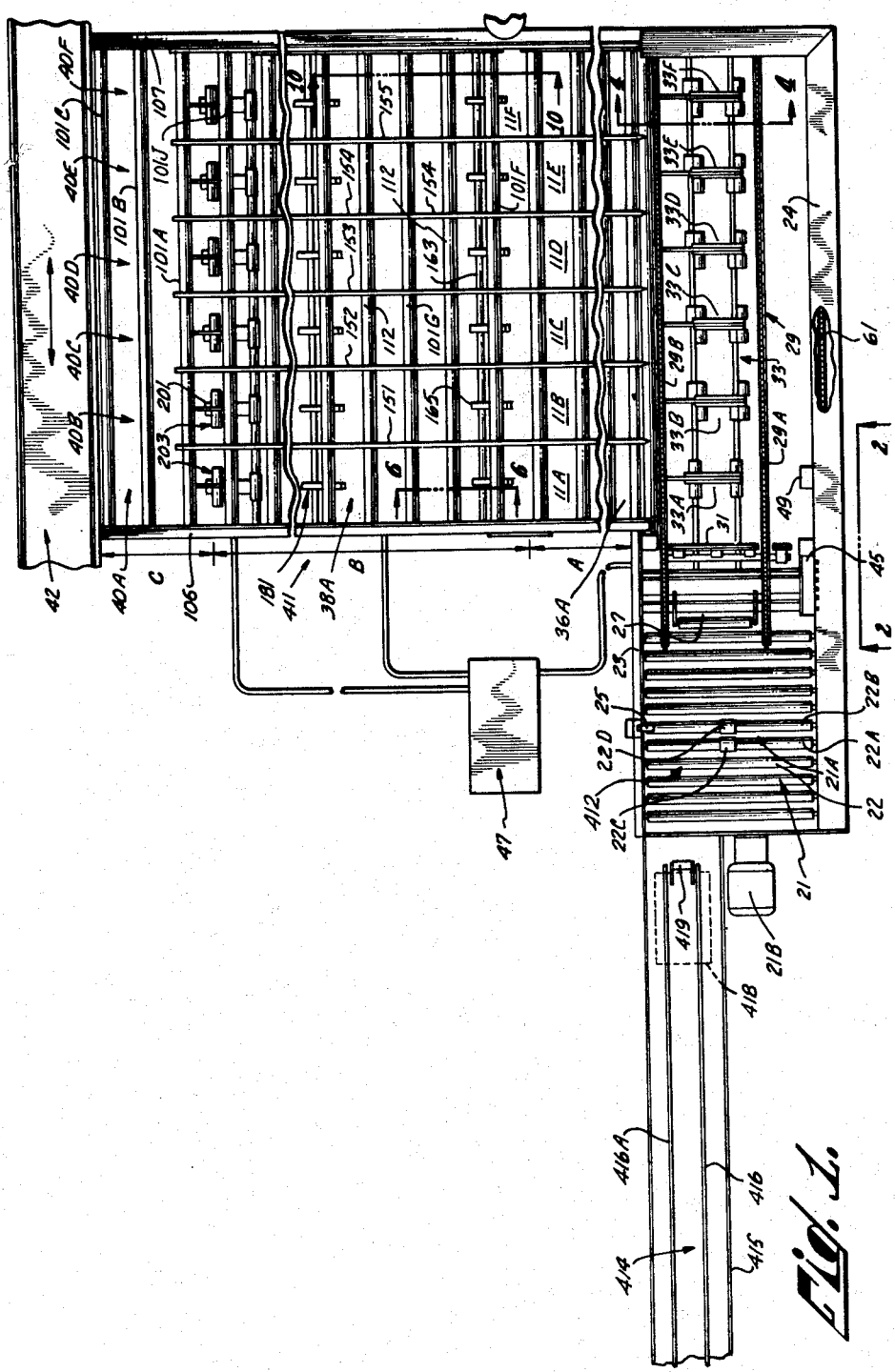
FIG. 1 is a schematic plan view of an input conveyor and selector mechanism and a battery of accumulator conveyors in accordance with the invention.

FIG. 1 illustrates an accumulator 411 in accordance with the invention and used in conjunction with an article selecting and transferring apparatus 412 substantially similar to the apparatus illustrated and described in my previously mentioned co-pending application. A feed conveyor 414 having a framework 415 and parallel roller chain conveyors 416, 416A conveys articles such as a produce box 418 shown in dotted lines on the feed conveyor and abutting against a stop bar 419.

The feed conveyor supplies articles to an input conveyor 21 which has a box turning section 21A which comprises a multiplicity of conveyor rollers 22 extending between a framework member 23 and a box housing 24. Framework member 23 also supports the input end of accumulator 411, and a conveyor roller drive motor 21B.

The box turning section has two adjacent conveyor rollers 22A, 22B whose midportions are thickened by collars 22C, 22D fastened to the rollers. A box or other article released by stop bar 19 onto the conveyor rollers strikes a turning tab 25 as it progresses. The rollers 22 are driven rollers. Rollers 22A and 22B are thickened so that the end of the article fed into the box turning section strikes the collar and is accelerated with respect to the end of the box striking the tab. Thus, the box is substantially re-oriented before it reaches a second stop bar 27 which lies at the beginning of an input conveyor section 29. A lock bar 31 stretches between conveyor chains 29A, 29B at a point just prior to a first transfer assembly 33A of a multiple transfer component 33. The component has a plurality of transfer assemblies 33A through 33F. The transfer assemblies are described in more detail later in conjunction with FIGS. 4 and 5.

The transfer means transfers articles from the input conveyor to the accumulator. Each transfer assembly is located adjacent to and in alignment with a conveyor of the accumulator. The illustrative accumulator has six such conveyors, 11A, 11B, 11C, 11D, 11E, 11F. Each of the accumulator conveyors, 11A through 11F has a receiving section, such as indicated at 36A. Each has in addition an accumulating section, such as indicated at 38A and a discharge section, as indicated at 40A through 40F, respectively. Articles transferred from the input conveyor to an accumulator conveyor traverse in order the receiving, accumulating and discharge sections. The extent of these sections is indicated by the dimension lines A, B and C of FIG. 1.

All of the accumulator conveyors discharge onto a reversible conveyor belt 42. The belt is exemplary only. The ultimate destination and disposition of the articles discharged from the accumulator will of course vary with the type of article and the processing steps involved.

The transfer means move objects from the input conveyor to selected ones of the accumulator conveyors in response to the operation of a selecting mechanism 45. The preferred selector mechanism is that described in detail in my co-pending application previously referred to. The selector mechanism is electrically coupled wtih a control console 47 which may be placed in any convenient location visible to the operator. An additional component of the semi-automatic control apparatus of the preferred accumulator is a priority switch mechanism 49 mounted to box housing 24 adjacent selector mechanism 45.

The selector mechanism is shown in some detail in FIG. 3. A plurality of control buttons 51 protrude from the outboard face of a selector case 53. Each control button is joined by a link assembly 54 to a cam rod 56. The motion of the cam rods is controlled in part by solenoids 58 and 59. The solenoids are a portion of an inter-lock system which forms no part of this invention and is therefore not described in detail.

The cam rods protrude interiorly of box housing 24 (see FIG. 2). The box housing shields a roller chain carrier 61 which carries a plurality of indicators 63 spaced at regular intervals along the extent of the chain conveyor. The chain carrier is co-extensive with and synchronized with the chain conveyor section 29 of input conveyor 21. Therefore, the path of the indicators is synonymous with the path of the articles on the input conveyor. The operator of the selector mechanism pushes one of the control buttons 51 and a cam rod 56 is thereby impelled into the path of an indicator carried by chain carrier 61. The indicator is oriented by passing over the protruding cam rod. Each indicator passing through the zone of the cam rods may be oriented by passing over any of the cam rods.

Each cam rod gives an indicator a different orientation. The orientation selected depends upon the transfer assembly which is desired to be activated. A plurality of limit-switches like limit-switch 66 of FIG. 2 are variously positioned to coincide with the path of an indicator in a particular orientation. Thus, a limit-switch 66, associated with transfer assembly 33A, is struck and tripped by an indicator when that indicator has been oriented by the lowest cam rod of the selector mechanism.

Transfer assembly 33A is illustrated in FIG. 1 in actuated position. An article carried by input conveyor section 29 is transferred to accumulator conveyor 11A by the actuated transfer assembly.

The operation of the transfer means is best described in conjunction with FIGS. 4 and 5.

In FIG. 4 transfer assembly 33F is shown in rest position. The actuated position of the transfer assembly is indicated by the phantom lines 71, 72. Each of the transfer assemblies is identical. Each comprises two substantially similar friction roller pairs 74, 75 and 76, 77. Each roller pair is pivotally mounted to a support arm. Rollers 74, 75 are supported by an arm 81. Rollers 76, 77 are supported by a substantially identical arm 83. Support arms 81, 83 are journalled on driven shafts 85, 86 respectively. The two driven shafts support all of the transfer assemblies. Each driven shaft has a plurality of sprockets 88, one fixed adjacent each roller pair support arm. A roller chain 91 links each sprocket 88 to a roller sprocket 92 fixed to an axle 93 on which the friction rollers are mounted to the support arm. Thus, the driven shafts not only support the friction rollers but impart motion to them.

Support arms 81 and 83 of each transfer assembly extend below the driven shafts. At a point remote from the driven shafts the support arms are pivotally fixed at spaced points to a pantograph arm 95. The pantograph arm is linked by a strap 97 to an actuating solenoid 99. When the solenoid is actuated the solenoid arm is pulled leftwardly in FIG. 4 and as a consequence the support arms and the friction rollers assume the position indicated by phantom lines 71 and 72. This is the transferring position. When solenoid 99 is actuated the rollers contact the bottom surface of an article on conveyor 29 and transfer that article from the conveyor to the accumulator. As previously described, the selector mechanism dictates which of the transfer assemblies will be activated and thus dictates which accumulator conveyor receives the article from the input conveyor.

Each of the receiving, accumulating and discharging sections of the accumulator conveyors comprises a plurality of spaced parallel conveyor rollers. There are two types of conveyor rollers. Each section is made up in part of driven rollers 101. The discharge section comprises three driven rollers 101A, 101B, 101C. While each of the accumulator conveyors can be constructed with independent roller conveyors, it is preferable to extend single conveyor rollers across the entire width of the accumulator between longitudinal framing members 106, 107. The roller driving mechanism may thereby be reduced to a single system instead of being duplicated for each of the accumulator conveyors necessary in a particular operation.

In the receiving and accumulating sections of each accumulator conveyor an idler roller 112 extends between framework members in the interval between adjacent pairs of driven rollers. The top surface of each idler roller is a fraction of an inch lower than the tops of the adjacent driven rollers. An article conveyed by rollers arranged thusly may be moved speedily with less power than if all of the rollers are driven or if all of the rollers constituting the conveyor are of the same height.

The extent of any of the component sections of the accumulator is of course determined by the size and number of articles which are to be accumulated therein. The spacing of the conveyor rollers is also determined by the size of the articles. However, the roller spacing may be modified within the limitations imposed by article size to meet the requirements of the inventive principle embodied in the conveyor chain apparatus disclosed herein.

The driven conveyor rollers are preferably chain and sprocket driven. Referring now to FIG. 10, each end of each conveyor roller, whether idler or driven roller, is rotatably mounted to the accumulator framework. Each driven roller has a chain sprocket 115 attached to one of its ends adjacent framework member 107. The driven rollers of the receiving section of the accumulator are driven by a chain 117. The driven rollers of the accumulating section are driven by a chain 118. A chain 119 drives the rollers of the discharge section. All of the chains are driven by an electric motor 121 mounted to framework member 107. The motor drives a sprocket 123 which is part of a chain and sprocket assembly 125 turning a first roller conveyor 101F of the accumulating section. A short roller chain 127 loops about a second drive sprocket 128 on conveyor roller 101F and a larger driven sprocket 129 on a second driven conveyor roller 101G of the accumulating section. Outboard of sprocket 129 a secondary drive sprocket 131 is fixed to conveyor roller 101G. Roller chain 118 of the accumulating section is driven by sprocket 131.

As can be seen from FIG. 10, a guide rail 135 supports chain 118 in mesh with the bottom portion of each roller sprocket. Likewise, roller chain 117 of the receiving section is held in mesh with the top portion of each drive sprocket by a guide rail 137. The bottom or returning portion of chain 117 is supported by a return rail 138. The return portion of chain 118 is confined by an upper guide rail 139. Similar guide rails 141, 142 define the paths of roller chain 119 of the discharge section of the conveyor (see FIG. 11).

The guide rails form a part of the apparatus embodying the inventive drive chain arrangement disclosed herein. In the case of the drive chain for the accumulator section the bottom guide rail not only insures that the chain is kept in mesh with each of the drive sprockets but supports the drive portion of the chain in a substantially straight line. The sprocket size, the chain size and the roller spacing is such that a number of links evenly spans the straight line distance from center to center of each driven roller. Thus, the working portion of the drive chain has no slack. The chain can be of a less sturdy size and still deliver the requisite amount of power because changing load requirements do not impose breaking loads on the slackless chain.

The necessary slack in any drive chain is confined in the invention to the return or non-working portion of the drive chain. As can be seen in FIG. 10, the return portion of drive chain 145 falls in a natural catenary loop 145 between adjacent drive sprockets. In order that the sprocket mesh properly with the chain, the sprocket size and the roller spacing is such that the catenary loop is defined by an even number of roller chain links.

The power saved by utilizing smaller lighter drive chains is reflected in the size of the electric motor 121. It is possible by utilizing the apparatus in accordance with the invention to drive the entire battery of accumulator conveyors from a single motor, including the conveyor rollers of the receiving section. The linkage between the drive system of the accumulating section and the receiving section is achieved by means of sprockets (not shown) placed on the like ends of the first roller of the accumulating section and the last roller of the receiving section outboard of framework member 106 (see FIG. 1). The sprockets are chain linked and of such a diameter that the accumulating section driven rollers rotate at a slower speed than the receiving section driven rollers.

FIGS. 6, 7 and 8 illustrate the article sensing apparatus located between the conveyor rollers of each accumulator conveyor. The sensing means of FIGS. 6, 7 and 8 are linked electrically in a manner to be described in conjunction with the description of FIGS. 9 and 12. FIG. 6 which is a fragmentary sectional elevation shows a plurality of the driven rollers 101 and idler rollers 112 in the accumulating section of conveyor 11A. A dividing rail 151 separates conveyor 11A from conveyor 11B. Similar dividing rails 152, 153, 154, 155 separate each of the remaining accumulator conveyors (see FIG. 1). The dividing rails are supported upon a plurality of upright plates 157 rising from channel braces 158 which extend between accumulator framework members 106 and 107. One channel brace 158 supports a mounting platform 161 beneath the accumulating section of each of the conveyors. A journal support 162 extends above the mounting platform at the downstream side of the platform. A pivot shaft 163 is held in the journal support. A curving sensing lever 165 is pivotally mounted intermediate of its length to pivot shaft 163. Extending upwardly from the point of attachment to the pivot shaft is a curved contact area 166. The sensing lever extends downwardly and rearwardly from the pivot shaft and then bends into a substantially horizontal counterbalance portion 167. An additional counterweight 168 is fixed to the end of the lever remote from the pivot shaft.

Contact portion 166 is held in a position above the level of the conveyor rollers by an extension spring 171. A limit screw 172 threadably engaged in the mounting platform and held by a lock nut 173 limits the downward swing of counterbalance portion 167 of the lever.

A normally closed limit-switch 175 is secured to the mounting platform. A contact 177 of the limit-switch extends upwardly toward the bottom surface of the sensing lever. The counterbalance portion of the sensing lever aided by extension spring 171 normally depresses contact 177 so that the limit-switch is held open. An article passing over the sensing lever lifts counterbalance portion 167 from the contact 177, permitting the limit-switch to close.

A second sensing lever 181 located downstream from the first sensing lever a distance equal to the total length of an article on the conveyor is similarly pivotally suspended above the mounting platform by a pivot support 182. The second sensing lever pivots on a pivot shaft 183. The sensing lever itself is similar in all respects to sensing lever 165, having a counterbalance section 187 and an additional counterweight 188. The second sensing lever is pulled downwardly by an extension spring 191 against a limit screw 192. The counterbalancing section of the second sensing lever depresses the contact of a limit-switch 193 which is hooked in series with limit-switch 175 through a conduit 194. Like limit-switch 175, the limit-switch of the second sensing lever is a normally closed limit-switch held in open position by the counterbalance section of the second sensing lever. The limit-switch closes when an article passes along the conveyor and depresses the sensing lever.

The paired limit-switches of the sensing levers act in concert with a stop bar solenoid 201. There is a stop bar solenoid in each of the accumulator conveyors of the accumulator proper. Each conveyor has a stop bar 203. The stop bar is held normally in the path of articles conveyed on a support arm 205 pivotally secured to a sleeve 206 mounted about a cylindrical pivot bar 207 which extends between framework members 106, 107 of the accumulator. All of the stopbar support arms of the accumulator conveyors are pivotally mounted about cylindrical bar 207. If the transverse extent of the accumulator is too great for such mounting, the stop bar support arms may be individually mounted by other more conventional means. However, in the illustrative embodiment the transverse extent of the six accumulator conveyors is not great enough to preclude the preferred illustrated mounting.

The support arm has a vertically extending member 209. A stub axle 211 extends transversely of the conveyor on either side of the vertical portion. A separate roller 212, 213 is pivotally mounted on the axle of each support arm. The stop bar, therefore, rolls easily when an article urged by the conveyor bears against it. A spring 214 extends from a tongue 215 of the support arm opposite the journal from the stop bar to brace 158A. The spring has a counterbalancing effect which overcomes the weight of the opposite support arm portion and the stop bar. Thus, normally the stop bar projects between conveyor rollers 101A and 101J into the path of conveyed articles. The position of the stop bar which precludes further passage of articles along the conveyor is maintained by a check roller 216, which contacts a lower surface of the stop bar support arm. The check roller is mounted on a lever arm 218 pivoted remotely from the check roller by a pivot mount 219 fixed to a support plate 221 which cantilevers outwardly from a framework bracing channel 158A. The solenoid 201 is also mounted to this channel brace.

Intermediate the check roller lever is pivot pin 223 links a solenoid strap 225 to the check roller lever. The strap extends from the pivot pin to the armature of solenoid 201. Thus, when solenoid 201 is actuated the check roller lever swings about pivot 219 pulling the check roller from beneath the support arm of the stop bar. Without check roller 216 in supporting position, the continuously urged articles on the conveyor can overcome the effect of counterspring 214 and pivot the stop bar downwardly about cylindrical bar 207 and override the stop bar. Therefore, articles may be discharged from the accumulating section of the conveyor which is defined at one end by the stop bar as long as solenoid 201 of the respective conveyor is actuated.

A counter switch 231 which is normally open is associated with the stop bar of each conveyor. Each counter switch is supported by a transverse support strap 233 which in turn is held at the end of the plates 221. Counter switch 231 has a contact screw 235 extending upwardly toward the respective support arm. The height of the contact screw is adjustable. A return spring 237 for the check roller lever extends between the contact screw and a mounting hole 239 in the end of solenoid strap 225. Spring 237 returns the check rollers to supporting position beneath the stop bar support arm when solenoid 201 is de-activated. This de-activation takes place when the counter switch has registered a given number of encounters with the support arm as it is depressed with each conveyed article passing over the stop bar.

Each article which is discharged from a conveyor passes over a stop bar and is sensed by the counter switch associated with the respective conveyor. Discharged articles enter the discharge section of the respective conveyor at the speed given them by the driven rollers 101H and 101J of the accumulating section. However, due to the gearing ratio described in conjunction with the description of FIG. 11, the articles discharged are accelerated by the driven rollers 101A, 101B, 101C of the respective discharge section. The acceleration is necessary to impel the discharge articles on the conveyor belt 42 at proper intervals thereon. The articles are re-oriented 90° both by the speed of belt conveyor 42 acting differently on the first discharged end of an article and by vertical roller posts 251, 251A (see FIG. 11) which a discharged article strikes depending on the direction of travel of conveyor 42.

The speed of the discharge sections of each accumulator conveyor is identical in the illustrative embodiment. This is true because the driven conveyor rollers extend across the accumulator in each conveyor. Since the receiving and accumulating sections are made in the same fashion, the conveyor roller speeds in each of the accumulating and receiving sections of the conveyors are identical. Although in the embodiment of the accumulator disclosed in this application the roller speeds of each of the accumulator sections are different, processing conditions may dictate similar speeds for two or all of the sections. However, in the usage for which the illustrative embodiment was designed, it is preferable to have a receiving section speedy enough to convey articles promptly from the transfer means and a discharge section which operates to move articles rapidly from the accumulating section.

Idler rollers are used between most adjacent pairs of driven conveyor rollers in the accumulating and receiving sections to lessen the accumulative force brought to bear on the stop bars by driven rollers spinning against the bottom surface of all of the conveyed articles held in place by the stop bar despite the continuously rotating driven rollers. The idler rollers help support the articles without imparting further load against the stop bar.

Preferably the idler rollers are located slightly lower than the adjacent driven rollers so that bowed articles will not tend to rest upon alternate idler rollers and not be driven at all.

The illustrative embodiment shows a specific use for the accumulator of the invention. The receiving belt conveyor 42 is reversible so that it may deliver discharged articles to one of two processing stations. These stations may be object stackers. The electrical control apparatus illustrated in FIGS. 9 and 12 is designed to be used with an accumulator supplying articles to stackers fed from a belt conveyor such as conveyor 42. Each of the stackers (not shown) is capable of adjustment to stack articles to a height of nine or ten or eleven or twelve articles. Therefore, the circuitry of FIGS. 9 and 12 provides for accumulating and discharging batches of accumulated articles to accommodate each of these different stack heights.

The six accumulator conveyors 11A through 11F are represented by parallel dotted lines running across the top of FIG. 9. Near the input or leftward end of the conveyors are the schematic representations of the paired limit-switches 175, 193 which sense for each accumulator conveyor the presence of a sufficient number of articles to supply a particular stack height. The solenoids 201 are schematically represented at the discharge end of the accumulator conveyors. These are the solenoids which remove check rollers 216 from supporting position with respect to stop bars 203 of each conveyor. Adjacent the solenoids are second limit-switches 231 which constitute the sensing part of the counting means of the accumulator. These counting means are actuated by the depressed support arm of the respective stop bars. As described in conjunction with FIG. 8, this actuation takes place when the conveyed article depresses the stop bar against the bias load of extension spring 214.

A control circuit, which is described in connection with FIGS. 9 and 12, is arranged to accomplish these two functions, namely, to determine, according to a predetermined priority arrangement, which conveyor is full so as to release boxes from that conveyor, and secondly, to count off and stop operation when the desired number of boxes has been passed from the selected accumulator conveyor. The sequencing of control to find the conveyor that is filled is effected by a rotary stepping switch, indicated generally at 283, while the counting of the number of boxes involves a second rotary stepping switch, indicated generally at 281. For the particular installation illustrated, conventional 8-bank stepping switches are used having twenty rotary positions. The first bank of stepping switch 281 is not used. The eighth banks of both stepping switches are used to light a set of panel lights in control console 47 which indicate to the operator when a particular accumulator conveyor has accumulated a sufficient number of articles to be dischargeable. These panel light banks have been eliminated from FIG. 9 to save space and the electrical connections for the panel lights have not been shown in FIG. 12 because that circuitry forms no part of the invention.

The active banks of the stepping switch 281 are banks 285, 286, 287, 288, 289 and 290. These banks are designated respectively as "double nine count" bank, "priority" bank, "eleven count" bank, "homing" bank, "re-cycle" bank, and "twelve count" bank. The count banks control the selected stack heights of the stackers which are supplied from the accumulator. The priority bank is part of the circuitry which controls the accumulator conveyor which will be preferably discharged each time its article sensing means indicate a sufficient number of articles in the conveyor. The homing and re-cycle designations will be apparent in the further description.

The active banks of the second multiple stepping switch 283 are the sensing bank 291, channeling bank 292, priority bank 293, holding bank 294, homing bank 295, re-cycling bank 296 and stack height bank 297. As previously described, the eighth banks 298, 299 of the stepping switches are controls for the panel lights.

The stepping switch 281 is actuated by a stepping solenoid 279, while the stepping switch 283 is operated by a stepping solenoid 311. The solenoids of each stepping switch are arranged in conventional fashion to operate a ratchet (not shown) when the solenoid is energized. When the solenoid is turned off, the ratchet, under the action of a spring advances the contact brush of each of the banks of the associated stepping relay. Both solenoids 279 and 311 actuate relay switches 325 and 326 respectively. Both stepping switch solenoids 279 and 311 operate on D.C. current from power supplies indicated at 313 and 315 respectively. Each power supply has two input terminals connected across an A.C. source. One of the D.C. output terminals is common with one of the A.C. input terminals.

In the specific control apparatus each accumulator conveyor may discharge its product at one of the two stackers, designated stacker #1 and stacker #2. When the function of each conveyor is initially assigned, toggle switches at the control console are positioned to indicate the stacker to which the articles from the conveyor will go via conveyor 42. For this purpose a plurality of stacker selector switches 301 through 306 are connected to the stepping switches. In FIG. 9 all of the stacker selector switches are oriented to send the articles from the conveyors to stacker #1. The toggle switches are all connected in series with a stacker height switch. For instance, all of the upper poles of the selector switches are connected to a stacker switch 303 associated with a stacker #1. The lower poles of the selector switches are all connected to a stacker switch 309 associated with stacker #2. The stacker switches have a plurality of contact points which represent the desired stack height. Thus the contacts are labelled 9, 10, 11 and 12 respectively. It should be noted that while stacks of nine and ten boxes are indicated, the circuit is arranged to dispense double this number of boxes, namely, eighteen and twenty boxes respectively, since the stackers with which the equipment is used are arranged to stack two stacks per batch of boxes delivered thereto. Of course, the circuit can be wired to make it possible to select other numbers of boxes to be dispensed. The position 9 of the stacker switches is connected to the 18 and 19 contacts of the "double nine count" bank 285. The 11 and 12 contacts of the stacker switches are respectively connected to the 11—19 contacts of the "eleven count" bank 287 and the 12—19 contacts of the "twelve count" 290.

Each of the normally open limit switches 175, 193 connects one side of the A.C. source to a corresponding one of a plurality of sensing relays, indicated at 271—276. The sensing relays are in turn each connected back to the other side of the A.C. source. Thus whenever one of the conveyors 11A–F is filled with boxes to the point that both of the associated limit switches are closed, a corresponding one of the sensing relays is energized. The closing of one of the sensing relays initiates action of the stepping relay 283.

To better understand the operation of this circuit, it will be assumed that the stepping switch 283 is in position to complete its circuit through contact 18 of each of the switch banks, this being considered the "home" position for this stepping switch. Likewise, the stepping switch 281 is assumed to be in its "home" position at contact 20 of each bank. When one of the channels fills with boxes, closing both the limit switches 175 and 193, one of the sensing relays 271, 276 is energized. This actuates a normally open switch 331 associated with the sensing relay. A circuit is completed from the one D.C. terminal of the power supply 315 through the contact 18 of the switch bank 295, back through the stepping solenoid 311, through the switch 326, and back to the other terminal of the power supply 315. This energizes the solenoid breaking the circuit at the normally closed switch 326 and releasing the solenoid 311. When the solenoid releases, it advances the stepping switch 283 to the contact 19. The same circuit through the solenoid 311 is again completed at contact 19 through switch bank 295, advancing the stepping switch 283 to contact 20.

When the stepping switch 283 is advanced to the contact 20 position, a circuit is completed through the bank 289 of the stepping switch 281 and the bank 296 which actuates an electronic timer relay 323. This is a conventional type of electronic timer which actuates a relay in the timer for any preset interval of time and then automatically releases. The electronic timer preferably includes a double-pole double-throw switch. Electronic timer relay 323 is preferably arranged to operate for 0.9 seconds. The switch of the timer 323, as well as the switches associated with all relay circuits in FIGS. 9 and 12, are shown in their non-actuated position. When the electronic timer relay is operated, it completes a circuit through the normally open contacts of one pole of its switch from the A.C. source through a time delay relay 321 which is of conventional slow release type having preferably a two second release time. During the time the relay 321 is closed, it completes a circuit from the power supply 315 to the normally open contacts of the other pole of the electronic timer relay 323 to the contact 20 of switch bank 294 to complete a circuit through the stepping switch solenoid 311. The solenoid 311 remains energized until the electronic timer relay automatically releases at the end of its 0.9 second interval. When the circuit through the solenoid 311 is broken, the stepping switch 283 steps to its contact 1 position.

The first six contacts of the switch bank 291 are connected respectively to each of three normally closed switches 333 associated with the sensing relays 271—276. Each of the switches 333 is connected back to the power supply 315 through one set of normally open contacts of the now closed relay 321. Thus, unless the first conveyor is filled and the relay 271 energized, a circuit is completed from the power supply 315 through the solenoid 311, causing the stepping switch to advance to the next contact position. This continues until either one of the sensing relays is actuated or the stepping switch 283 advances to its number 12 contact position, from which point it automatically advances to the number eighteen or "home" position by reason of the circuit completed through the switch bank 293.

When the stepping switch 283 advances to a contact position in which one of the sensing relays has been operated, the circuit through the solenoid 311 is interrupted by virtue of the fact that the associated normally closed switch 333 has been opened by the sensing relay. Thus the stepping switch 283 comes to rest at the contact position corresponding to the first full channel in the accumulator conveyor. When the time delay relay 321 drops out at the end of its slow release interval, it reestablishes a circuit through the normally closed contacts of one pole of the electronic timer relay 323 back to one side of the A.C. source from the switch bank 292 of the stepping switch 283. The switch bank 292 completes a circuit back to one of a plurality of hold relays 261—266, all of which are connected through a common return back to the other side of the A.C. source. In this manner, depending upon the position of the stepping switch 283, one of the hold relays 261—266 is energized, corresponding to the conveyor in which the boxes have filled up and closed the limit switches 175 and 193.

Each of the hold relays is arranged to actuate a corresponding one of the release solenoids 201 through a set of normally open contacts. As a result, the selected release solenoid 201 is actuated, permitting the boxes in the accumulator conveyor to be moved on to the conveyor 42 to the appropriate stacker. As the boxes pass the release point, the associated switch 231 is actuated as each box passes the release point. The closing of any one of the switches 231 actuates a relay 319. The relay 319 is preferably of a type which actuates only momentarily in response to the closing of the actuating circuit. The relay 319 operates a switch 317 completing a circuit through the solenoid 279 from the power supply 313. This advances the stepping switch 281 to its first contact position. As each box passes the counting switch 231, the stepping switch 281 is advanced through its successive positions. The stepping switch 281 continues to be stepped as the boxes pass the switch 231 until it reaches either the contact 11, contact 12, contact 18 or contact 20 position. Depending upon the setting of the stacker height switches 308 and 309, a circuit is completed at one of these four positions from the power supply 313 to the solenoid 279, to the switch 325 and through one of the banks 285, 287 or 290, through one of the switches 308 and 309, one of the switches 301—306 through a switch bank 297 of the stepping switch 283 back to the power supply 313. This circuit causes the stepping switch 281 to automatically progress to contact 20 or its "home" position.

At its "home" position, the stepping switch 281 completes a circuit through the re-cycle bank 289 and the re-cycle bank 296 of the stepping switch 283 to actuate the electronic timer relay 323. This causes the solenoid 311 to be energized in the manner described above and to be released after the 0.9 second delay. If this advances the stepping switch 283 to a contact corresponding to one of the sensing relays 271—276 which has been energized, the boxes in the associated conveyor are released and the counting process of the stepping switch 281 is repeated.

From the arrangement as thus fare described, it will be appreciated that each conveyor is examined in sequence to see if it is filled with boxes. If so, the boxes are released and counted and the circuit then examines the next conveyor, etc.

The normal sequence may be altered by positioning a priority switch 49. If conveyor number 4 is selected by the priority switch, stepping switch 283 may be caused to automatically by-pass from one to five of the first five contact positions by the setting of the switch 49. Thus if it is desired to give priority to the second conveyor, the first conveyor will be passed by at contact 1 and will not be picked up until the stepping switch 283 advances to contact 7 which is connected in parallel with contact 1 in both the switch banks 291 and 292. This is effected by providing an alternate energizing path for the solenoid 311 by means of the priority switch bank 293. Thus a current path is provided from the power supply 313 to the solenoid 311 through the normally open contacts of the relay 321 (which is in an energized state and is not as yet released) through normally closed contacts of the electronic timer 323 which has reached the end of its delay interval, through the contact 20 of the priority bank 287 of the stepping switch 281, through the priority switch 49 back to the selected contact of the priority bank 293, the stepping switch 283. The priority switch 49 works on a progressive shorting basis, i.e., as the switch arm is advanced from contact to contact, it shorts together all contacts which it has passed. In this way, the stepping switch 283 advances to a contact position in which no circuit is completed through the priority bank 293 back to the priority switch 49. When the selected priority conveyor is filled with boxes, stepping switch 283 stops at this point causing the priority conveyor to be dispensed. Operation of the stepping switch 283 then continues sequentially through the remaining conveyors in the same manner as previously described.

The switches 301 to 306 in combination with a set of normally open contacts of each of the holding relays 261—266 selectively provide an A.C. signal on output leads 351 and 352. The presence or absence of an A.C. signal is determined by the settings of the switches 301—

366. The presence or absence of the A.C. signal in turn determines the direction of the belt conveyor 42 to direct the boxes to either the #1 stacker or the #2 stacker.

In addition to the apparatus for automatically discharging conveyors as they contain the requisites number of articles, a plurality of cleanout switches 361 through 366 supply closed circuits which unlock the stop bar of any chosen conveyor and causes the discharge of the articles thereon.

The accumulator of the invention provides for short term storage of a multiplicity of differing articles whether the difference between the articles is in their nature or in the process step for which they are subsequently destined. The number of conveyors which may be batteried within a single accumulator is flexible. Accumulator length is easily varied to accommodate different sized articles. The apparatus sensing the presence in a particular accumulator conveyor of a number of articles may be arranged at any desired point with respect to the head article in the conveyor. The illustrative embodiment shows each accumulator conveyor to be substantially identical in its arrangement. It need not be. Apparatus embodying first sensing means may be located differently within each accumulator conveyor so that the number of articles required to condition the conveyor for discharging may differ. While a semi-automatic electrical control system has been illustrated the accumulator well may be operated by manual controls. Transfer means of a particular type are not necessary to the operation of the accumulator. The accumulator may be fed manually at a great loss in efficiency. The input conveyor and the transfer means illustrated may be replaced by individual conveyors transferring articles to the accumulator at the command of control mechanisms.

The invention may be embodied in apparatus having any number of accumulator conveyors. The conveyors may be commonly or individually driven. If individually driven, they need not comprise parallel lanes but may diverge to fit the particular purposes for which they are designed. While conveyors comprising transverse rollers are preferable, belt or chain conveyors may be used in conjunction with the invention. The speed relationship of the various sections of the accumulator conveyors may be varied to meet differing conditions. Apparatus embodying the invention may vary to meet most of the differing conditions encountered in the conveying art. No particular type of article is precluded from the contemplation of the invention. The illustrative embodiment should not be considered to limit the scope of the invention defined in the appended claims.

I claim:

1. Apparatus for handling articles comprising a plurality of conveyors each having receiving, accumulating, and discharge sections and adapted respectively to receive different preselected ones of said articles, means for selectively transferring articles to respective ones of the conveyors, a movable stop associated with each conveyor, a plurality of first sensing means located in each conveyor for indicating the presence of a predetermined number of articles on each conveyor behind the stop means, counting means for registering the number of articles discharged from each conveyor on release of the associated stop means, first control means responsive to any one of said sensing means when a predetermined number of articles is stored in at least one of the conveyors for selectively releasing in sequence the respective stop means of one of said several conveyors in which the predetermined number of articles has accumulated to release the articles in the accumulating section of said one of the conveyors to the discharge section thereof when the first sensing means registers a predetermined number of articles in the accumulating section of that conveyor, and second control means responsive to the counting means for selectively re-setting the respective stop means of one of said several conveyors when the counting means registers the release of a given number of articles from the accumulating section of the respective conveyor.

2. Apparatus for handling articles comprising a plurality of conveyors each having receiving, accumulating, and discharge sections and adapted respectively to receive different preselected ones of said articles, first sensing means for registering the presence of a predetermined number of articles on each conveyor, second sensing means for registering the number of articles discharged from each conveyor, a movable stop associated with each conveyor between the accumulating and discharge sections thereof, first control means for selectively releasing the respective stop means of the several conveyors to release the articles in the accumulating section of the respective conveyors to the discharge section thereof when the first sensing means registers a predetermined number of articles in the accumulating section of that conveyor, second control means for selectively re-setting the respective stop means of the several conveyors when the second sensing means registers the release of a given number of articles from the accumulating section of the respective conveyor, the sensing means for registering the number of articles discharged from the conveyor including a stop roller removably imposed in the path of the articles in the conveyor and adapted to preclude passage of the first and subsequent articles along the conveyor, a check roller holding the stop roller in precluding position, a solenoid operable to move the check roller so that the stop roller moves from the path of the articles under urging of each article, and counting means responsive to the motion of the stop roller as succeeding articles are discharged across the stop roller from the accumulating section into the discharge section of the conveyor.

3. Apparatus in accordance with claim 2 including means for driving the discharge section of each conveyor at a greater speed than the receiving and accumulating sections of the conveyor.

4. Apparatus for handling articles comprising a plurality of conveyors each having receiving, accumulating, and discharging sections and adapted respectively to receive different preselected ones of said articles, means for selectively transferring articles to respective ones of the conveyors, drive means for each section of each conveyor, a plurality of paired, serially connected first normally open electrical switches for registering the presence of articles on each conveyor, a plurality of stop bars each pivotally mounted to swing into and out of the path of articles conveyed on each conveyor, a plurality of second normally open electrical switches each adapted to be closed by a respective stop bar each time an article passes over the stop bar on each conveyor, means locking the stop bar of each conveyor to preclude passage of articles from the accumulating section to the discharge section of each conveyor, a solenoid adapted to operate each of the means for locking the stop bar, a plurality of electrical relays each selectively operating the solenoid of a conveyor stop bar, means for selecting which of the conveyor stop bars is to be unlocked when the respective paired normally open electrical switches indicate the presence of articles in the respective conveyor, and second control means for re-setting the respective stop bars of the several conveyors when the respective second normally open electrical switch registers the release of a given number of articles from the accumulating section of the respective conveyor.

5. Apparatus in accordance with claim 4 in which the second control means for selectively re-setting the respective stop bars of the several conveyors comprises a plurality of stepping switches each adapted to receive pulses from the second normally open switch of each conveyor, a selector switch, a sensing relay having a normally closed pair of contact points, said contact points connecting when closed between a power source and the control relay for the solenoid adapted to operate the means for locking the stop bar of a conveyor, a differing summing point on each of the stepping switches, each summing point being connected to the selector switch, said selector switch being adjustable to choose which of the stepping switches controls the number of articles discharged from the conveyor prior to the activation of the sensing relay which switches the normally closed contacts to an open position and de-activates the solenoid holding the stop bar unlocked.

6. Apparatus for handling articles comprising a plurality of conveyors, each conveyor including releasable stop means for stopping movement of articles at a stop point along the conveyor, first article sensing means positioned upstream from the stop means and actuated by a predetermined number of accumulated articles held by the stop means, and second article sensing means positioned downstream of the stop means for sensing the passage of each article when the associated stop means is released, counting means responsive to actuation of any one of said second article sensing means, and control means for operating the several stop means, the control means including means responsive to actuation of any one of said first article sensing means for sequentially coupling each of the stop means to the associated first sensing means, the stop means when coupled to a first sensing means that is actuated by an accumulation of articles in the associated conveyor being in turn actuated to release articles on the associated conveyor, and means responsive to the counting means for re-setting the stop means after a predetermined number of articles have been released by the stop means.

7. Apparatus as defined in claim 6 wherein said control means further includes settable means for controlling the priority of operation of the several stop means when more than one of said first sensing means is actuated.

References Cited in the file of this patent
UNITED STATES PATENTS

| | | |
|---|---|---|
| 2,728,466 | Postlewaite | Dec. 27, 1955 |
| 2,953,234 | Abendschein | Sept. 20, 1960 |
| 2,936,263 | Jones | May 30, 1961 |
| 2,987,251 | Alexander | June 6, 1961 |